H. H. WELCH.
Heating Drum.
No. 2,699. Reissued July 23, 1867.
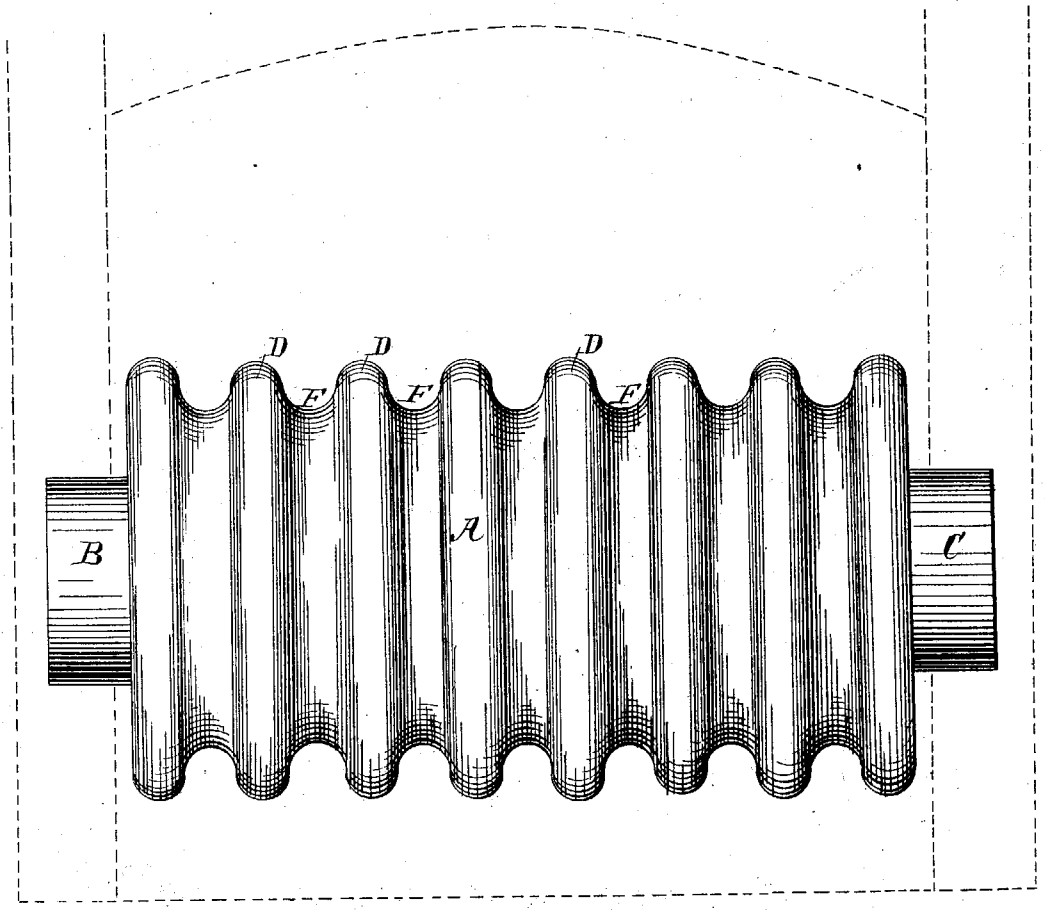
N. PETERS, Photo-Lithographer, Washington, D. C.

United States Patent Office.

H. H. WELCH, OF ATHENS, OHIO.

*Letters Patent No.* 49,325, *dated August* 8, 1865; *reissue No.* 2,699, *dated July* 23, 1867.

FIRE-PLACE HEATER.

The Schedule referred to in these Letters Patent and making part of the same.

TO ALL WHOM IT MAY CONCERN:

Be it known that I, H. H. WELCH, of Athens, in the county of Athens, and State of Ohio, have invented a new and useful improvement in Fire-Place Heaters; and I do hereby declare that the following is a full, clear, and exact description thereof, which will enable those skilled in the art to make and use the same, reference being had to the accompanying drawings, forming part of this specification, in which—

Figure 1 represents my heater within a fire-place.

Figure 2 is a transverse vertical section, taken on the line *x* of fig. 1.

Similar letters of reference indicate corresponding parts.

The object of this invention is to save a large amount of the heat that is now lost when fuel is burnt in fire-places, and it consists in the construction and application of a heater, to be placed in a fire-place next to and partly ensconced within the fire-back thereof, which heater is to be constantly supplied with fresh air, which air, after being heated, is discharged through suitable conveying pipes and registers to any part of a house.

A designates the heater. It is made of cast iron or other suitable material, and of such a size that it may be received within the fire where it is to be used without obstructing the fire. The back wall of the fire-place should have a recess to let the back part of the heater set in it a little distance, the rest of the heater, the front part of it, protruding into the fire-place. C is a pipe leading from one end of the heater, and which may connect with any suitable pipe-opening without the house into the open air. Through the pipe C fresh air will pass into the heater. B is a pipe leading from the opposite end, and which may connect with any suitable pipe or pipes leading to the various apartments of the house. Through this pipe, B, the heated air is permitted to pass into such connecting pipes. The pipe B should be larger than the pipe C, because the air will be greater in volume after it is heated. The heater is made irregular in form, (it may be a corrugated cylinder,) having projections D and recesses F, for the purpose of increasing the extent of its heat-radiating surface without enlarging its general dimensions. By giving the heater such a form, the surface exposed to the fire and heat of the fire-place is increased. The heater is not to be set snugly against the sides of the recess in the fire-place, but it should be clear therefrom, so as to let the products of combustion and hot air pass around and on all sides of it. The heater may also be raised a few inches above the level of the grate or hearth, but the fuel supplied to the fire-place may be allowed to reach up to and around the front of the heater.

My invention will be the means of saving fuel, since one or more apartments, besides that where the fire-place is situated, can be comfortably warmed with the fuel burned in such fire-place alone.

Having thus described my invention, I claim as new, and desire to secure by Letters Patent—

As a new article of manufacture, the fire-place heater A, constructed as herein described, that is to say, with the projections or corrugations D E and pipes B C, for the purpose explained.

H. H. WELCH.

Witnesses:

WM. L. PERKINS,

W. W. MAGILL.